(12) United States Patent
Okada et al.

(10) Patent No.: US 9,357,100 B2
(45) Date of Patent: May 31, 2016

(54) IMAGE CAPTURING APPARATUS, IMAGE CAPTURING METHOD, AND IMAGE CAPTURING CIRCUIT

(75) Inventors: Shunsaku Okada, Tokyo (JP); Kazuhide Noguchi, Tokyo (JP); Takashi Sakashita, Tokyo (JP)

(73) Assignees: NEC CORPORATION, Tokyo (JP); NEC Space Technologies, Ltd., Tokyo (JP); Teledyne Dalsa Inc., Ltd., Waterloo (CA)

(*) Notice: Subject to any disclaimer, the term of this patent is extended or adjusted under 35 U.S.C. 154(b) by 457 days.

(21) Appl. No.: 13/379,848

(22) PCT Filed: Jun. 17, 2010

(86) PCT No.: PCT/JP2010/004034
§ 371 (c)(1),
(2), (4) Date: Jan. 24, 2012

(87) PCT Pub. No.: WO2010/150494
PCT Pub. Date: Dec. 29, 2010

(65) Prior Publication Data
US 2012/0127542 A1    May 24, 2012

(30) Foreign Application Priority Data
Jun. 25, 2009    (JP) ................ 2009-150811

(51) Int. Cl.
*H04N 1/04* (2006.01)
*H04N 1/40* (2006.01)
*H04N 1/401* (2006.01)
*H04N 5/232* (2006.01)
(Continued)

(52) U.S. Cl.
CPC .......... *H04N 1/40056* (2013.01); *H04N 1/401* (2013.01); *H04N 5/23267* (2013.01); *H04N 5/3692* (2013.01); *H04N 5/372* (2013.01)

(58) Field of Classification Search
None
See application file for complete search history.

(56) References Cited

U.S. PATENT DOCUMENTS 4,922,337 A    5/1990   Hunt et al.
2006/0001922 A1*  1/2006  Gawlik ................ 358/505
(Continued)

FOREIGN PATENT DOCUMENTS

EP    1868366 A1    12/2007
JP    3-266574 A    11/1991
(Continued)

OTHER PUBLICATIONS

European search report for EP10791818.7 dated Oct. 29, 2012.
(Continued)

*Primary Examiner* — Helen Q Zong
(74) *Attorney, Agent, or Firm* — Sughrue Mion, PLLC (57) ABSTRACT

Provided is an image capturing apparatus for capturing an image of a target object by optically scanning the target object by moving in a predetermined scanning direction. The apparatus includes a light-receiving device that is disposed on a light-receiving surface of the image capturing apparatus and accumulates an electric charge according to an amount of light received from a light detection window, a length of which in the scanning direction is shorter than a length in the scanning direction of an area defined as one pixel of the target object; and an output device that outputs the electric charge accumulated by the light-receiving device when the light-receiving device has completed the optical scanning of the area defined as one pixel.

8 Claims, 10 Drawing Sheets

(51) Int. Cl.
*H04N 5/369* (2011.01)
*H04N 5/372* (2011.01)

(56) References Cited

U.S. PATENT DOCUMENTS

| | | | |
|---|---|---|---|
| 2006/0023943 A1* | 2/2006 | Makino | 382/167 |
| 2006/0262362 A1 | 11/2006 | Murakoshi | |
| 2008/0225357 A1* | 9/2008 | Ohara et al. | 358/498 |
| 2010/0057278 A1* | 3/2010 | Lee | 701/16 |
| 2010/0238522 A1* | 9/2010 | Anderle et al. | 358/483 |

FOREIGN PATENT DOCUMENTS

| | | |
|---|---|---|
| JP | 2005057552 A | 3/2005 |
| JP | 2008-22221 A | 1/2008 |
| WO | 2007144304 A | 12/2007 |

OTHER PUBLICATIONS

International Search Report for PCT/JP2010/004034 mailed Jul. 13, 2010.

Communication dated Feb. 25, 2014 from the Japanese Patent Office in counterpart Japanese Application No. 2009-150811.

* cited by examiner

LIGHT-RECEIVING START TIME OF PIXEL AREA B
BY FIRST LIGHT-RECEIVING UNIT($T_0$)

FIG. 3B

LIGHT-RECEIVING START TIME OF PIXEL AREA B
BY SECOND LIGHT-RECEIVING UNIT($T_1$)

FIG. 3C

LIGHT-RECEIVING END TIME OF PIXEL AREA B
BY FIRST LIGHT-RECEIVING UNIT($T_2$)

FIG. 3D

LIGHT-RECEIVING END TIME OF PIXEL AREA B
BY SECOND LIGHT-RECEIVING UNIT($T_3$)

IMAGE CAPTURING APPARATUS, IMAGE CAPTURING METHOD, AND IMAGE CAPTURING CIRCUIT

TECHNICAL FIELD

The present invention relates to an image capturing apparatus for capturing an image of a target object to be captured by optically scanning the target object when moving in a predetermined scanning direction, and a corresponding image capturing method, and a corresponding image capturing circuit.

This application claims priority to and the benefits of Japanese Patent Application No. 2009-150811 filed on Jun. 25, 2009, the disclosure of which is incorporated herein by reference.

BACKGROUND ART

In related art, when performing image capturing by scanning a target object to be captured in a predetermined scanning direction (e.g., image capturing using a scanner or satellite observation using satellite's orbits), an image is captured using an optical detector called a line charge coupled device (CCD) in which a plurality of light-receiving elements, each corresponding to one pixel, are arranged in a direction (hereinafter, referred to as a line direction) perpendicular to the scanning direction.

Hereinafter, an image capturing method of related art by an image capturing apparatus using the line CCD will be described using the drawings.

FIGS. 6A to 6D are diagrams showing the image capturing method by the image capturing apparatus of the related art.

Figure 6A:
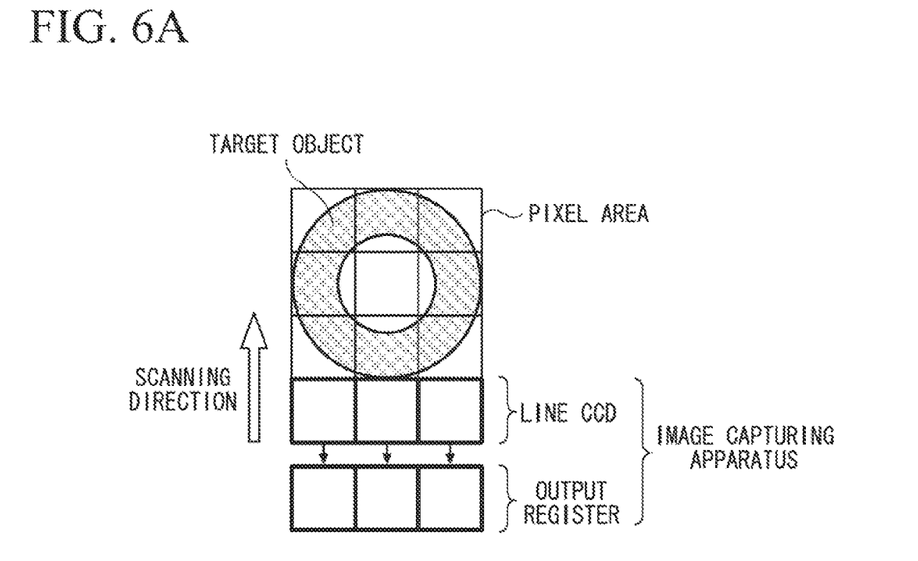
FIG. 6A is a diagram showing an image capturing method by an image capturing apparatus of related art.

First, when image capturing is started, the image capturing apparatus moves in the scanning direction as shown in FIG. 6A.

Figure 6B:
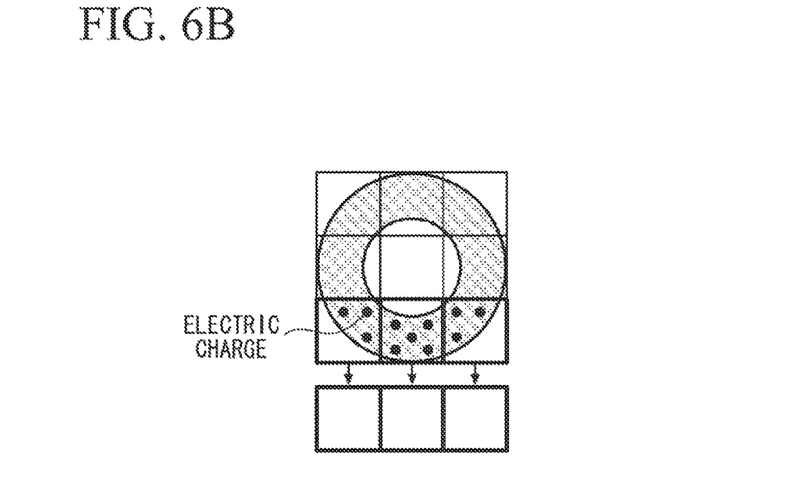
FIG. 6B is another diagram showing the image capturing method by an image capturing apparatus of related art.

Next, each light-receiving element of the line CCD receives light from an area (hereinafter, referred to as a pixel area) acquired as one pixel of a target object and accumulates an electric charge corresponding to an amount of light received by photoelectric conversion as shown in FIG. 6B.

Figure 6C:
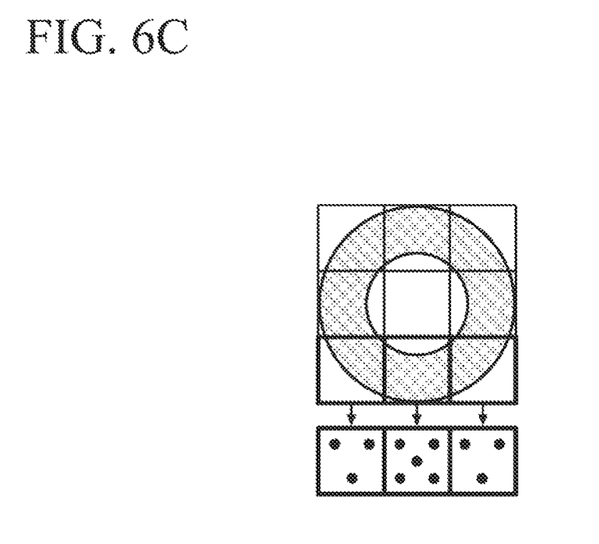
FIG. 6C is another diagram showing the image capturing method by an image capturing apparatus of related art.
Figure 6D:
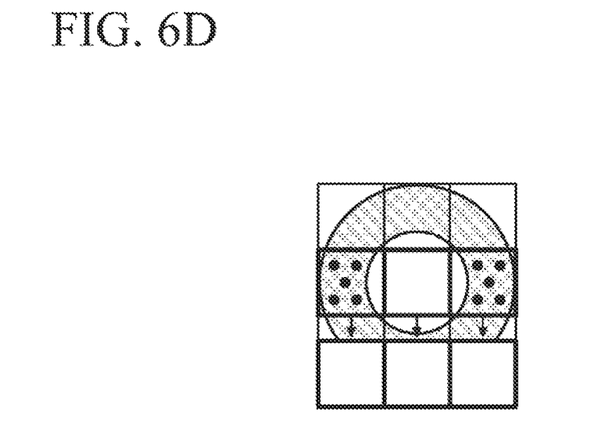
FIG. 6D is another diagram showing the image capturing method by an image capturing apparatus of related art.

When the line CCD completes the scanning of a certain pixel area, each light-receiving element outputs the accumulated electric charge to an output register as shown in FIG. 6C, and starts to receive light from the next pixel area as shown in FIG. 6D.

Thereby, the line CCD sequentially outputs an electric charge corresponding to an amount of light of a pixel area of the line direction. Accordingly, it is possible to convert the output electric charge into pixel information of the line direction and obtain an image of a target object by arranging the relevant pixel information in the scanning direction.

In Patent Document 1, a technique of reducing a blur occurring in the scanning direction of an image captured by a line CCD is disclosed.

PRIOR ART DOCUMENT

Patent Document

Patent Document 1: Japanese Unexamined Patent Application, First Publication No. 2005-57552.

DISCLOSURE OF INVENTION

Problem to be Solved by the Invention

However, in the image capturing method of the related art, an electric charge accumulated in each of light-receiving elements by image capturing from the image capturing apparatus, which moves in the scanning direction of a target object, or moves in a manipulation direction, results from two pixel areas. Thus, there is a problem in that a blur occurs in the scanning direction of an acquired image and a clear image may not be acquired.

Hereinafter, the reason why the blur occurs in the scanning direction of the image will be described using the drawings.

FIGS. 7A to 7D are diagrams showing why the blur occurs in the scanning direction of the image.

Figure 7A:
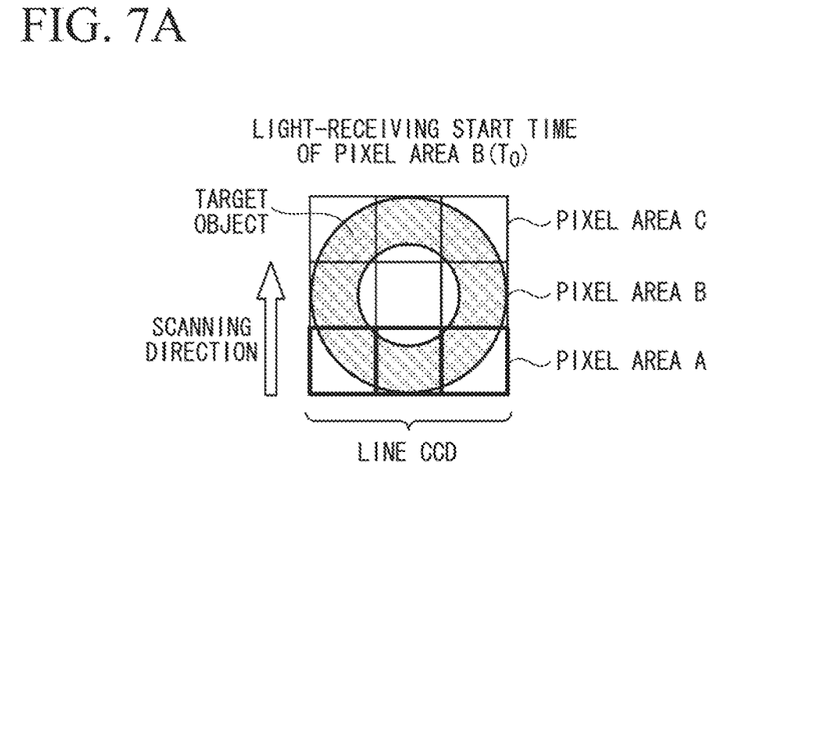
FIG. 7A shows a scanning state for indicating why a blur occurs in a scanning direction of an image.
Figure 7B:
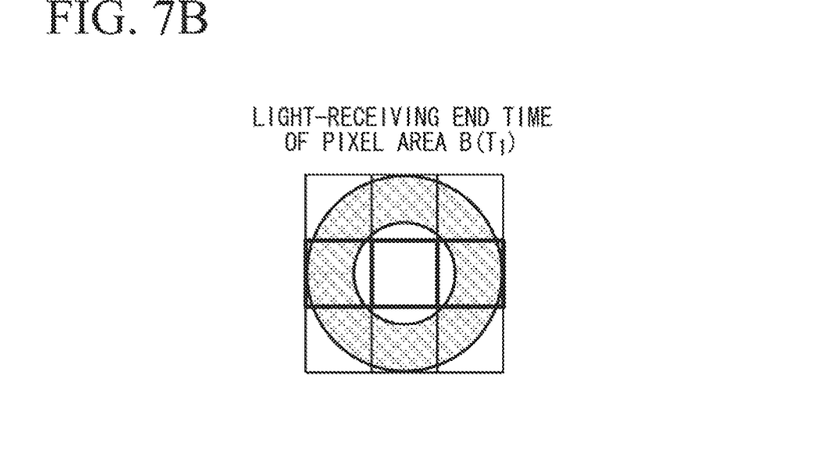
FIG. 7B is another diagram showing the scanning state.

If the case where the scanning of pixel area B is performed, that is, the case where a transition from FIG. 7A to FIG. 7B is made is illustrated as an example, each of light-receiving elements of the line CCD receives light from two pixel areas of pixel area A and pixel area B.

Figure 7C:
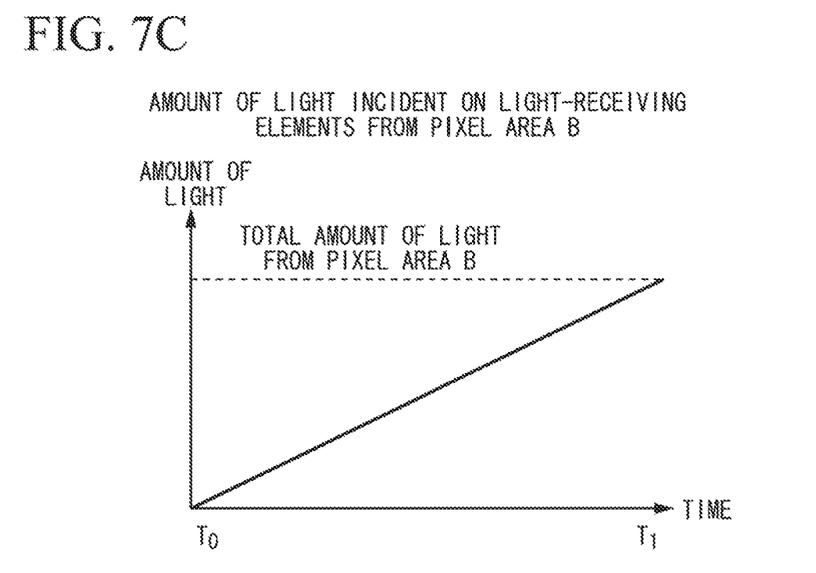
FIG. 7C is a diagram showing an amount of light of an image area B for indicating why a blur occurs in a scanning direction of an image.

Specifically, as shown in FIG. 7C, light received by each of the light-receiving elements of the line CCD from the pixel area B is absent at a light-receiving start time of the pixel area B (hereinafter, referred to as time $T_0$), and an amount of light from the pixel area B is increased in accordance with the relevant movement. At a light-receiving end time of the pixel area B (hereinafter, referred to as time $T_1$), each of the light-receiving elements of the line CCD receives light from the whole surface of the pixel area B.

Figure 7D:
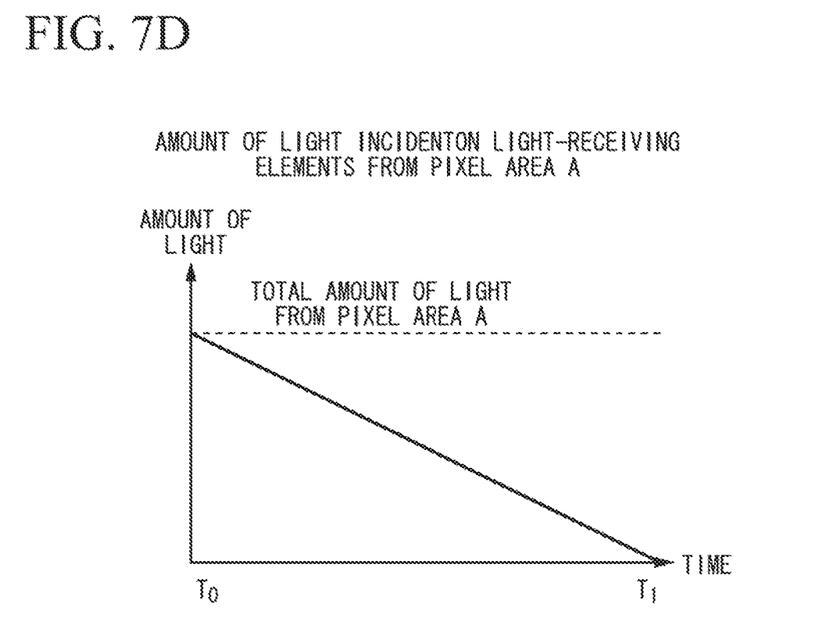
FIG. 7D is a diagram showing an amount of light of an image area A for indicating why a blur occurs in a scanning direction of an image.

On the other hand, as shown in FIG. 7D, each of the light-receiving elements receives light from the whole surface of the pixel area A at the time $T_0$, and an amount of light from the pixel area A is decreased in accordance with the relevant movement. At the time $T_1$, light received by each of the light-receiving elements from the pixel area A is absent.

As described above, a blur occurs in the scanning direction in an image acquired by a one-dimensional sensor of the line CCD or the like, because the light-receiving element receives light from another pixel area adjacent in the scanning direction by the same amount of light as that from the target pixel area until the scanning of each pixel area starts and ends.

The present invention has been made in view of the above circumstances, and an object of the invention is to provide an image capturing apparatus, an image capturing method, and an image capturing circuit that decrease a blur occurring in a scanning direction of an image captured by a one-dimensional sensor.

Means for Solving the Problem

The present invention has been made to solve the above problems, and provides an image capturing apparatus for capturing an image of a target object by optically scanning the target object by moving in a predetermined scanning direction, the apparatus comprising:

a light-receiving device that is disposed on a light-receiving surface of the image capturing apparatus and accumulates an electric charge according to an amount of light received from a light detection window, a length of which in the scanning direction is shorter than a length in the scanning direction of an area defined as one pixel of the target object; and an output device that outputs the electric charge accumulated by the light-receiving device when the light-receiving device has completed the optical scanning of the area defined as one pixel.

The present invention also provides an image capturing method using an image capturing apparatus for capturing an image of a target object by optically scanning the target object by moving in a predetermined scanning direction, the method comprising:

accumulating, by a light-receiving device, an electric charge according to an amount of light received from a light detection window, wherein the light-receiving device is disposed on a light-receiving surface of the image capturing apparatus and has the light detection window, a length of which in the scanning direction is shorter than a length in the scanning direction of an area defined as one pixel of the target object; and outputting, by an output device, the electric charge accumulated by the light-receiving device when the light-receiving device has completed the optical scanning of the area defined as one pixel.

The present invention also provides an image capturing circuit for capturing an image of a target object by optically scanning the target object by moving in a predetermined scanning direction, the circuit comprising:

a light-receiving circuit that is disposed on a light-receiving surface of the image capturing apparatus and accumulates an electric charge according to an amount of light received from a light detection window, a length of which in the scanning direction is shorter than a length in the scanning direction of an area defined as one pixel of the target object; and an output circuit that outputs the electric charge accumulated by the light-receiving circuit when the light-receiving circuit has completed the optical scanning of the area defined as one pixel.

Effect of the Invention

According to the present invention, a length in a scanning direction of a detection window provided in a light-receiving device is shorter than a length in the scanning direction of a pixel area. Thereby, it is possible to reduce a blur of the scanning direction of an acquired image, because an amount of light received from a scanned pixel area is greater than an amount of light received from another pixel area.

MODE FOR CARRYING OUT THE INVENTION

First Embodiment

Hereinafter, the first embodiment of the present invention will be described in detail with reference to the drawings.

Figure 1:
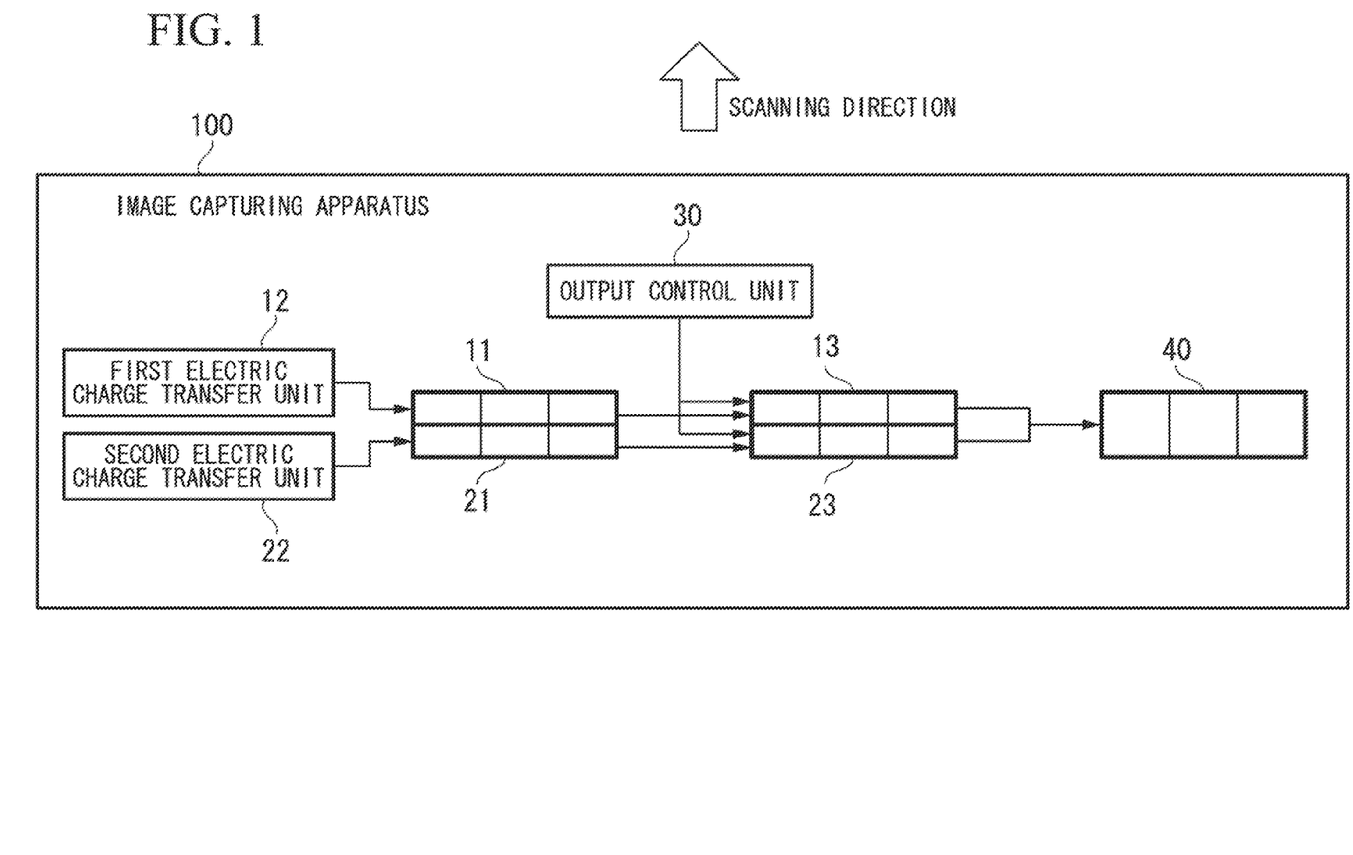
FIG. 1 is a schematic block diagram showing a configuration of an image capturing apparatus according to a first embodiment of the present invention.

FIG. 1 is a schematic block diagram showing a configuration of an image capturing apparatus according to the first embodiment of the present invention.

An image capturing apparatus 100 is an apparatus for capturing an image of a target object by optically scanning the target object by moving in a predetermined scanning direction. The apparatus includes a first light-receiving unit 11 (a light-receiving device), a first electric charge transfer unit 12, a first buffer register 13, a second light-receiving unit 21 (a light-receiving device), a second electric charge transfer unit 22, a second buffer register 23, an output control unit 30 (an output device), and an output register 40.

The first light-receiving unit 11 is a one-dimensional sensor having a plurality of light-receiving elements arranged in a direction (hereinafter, referred to as a line direction) perpendicular to a scanning direction for a target object (to be captured) on a light-receiving surface of the image capturing apparatus 100.

The light-receiving element accumulates an electric charge according to an amount of light received from a light detection window by photoelectric conversion. The light detection window is constituted by a photodiode or the like, and the electric charge is accumulated by a CCD or the like.

A length in the scanning direction of the light detection window is half of a length in the scanning direction of an area (called a "pixel area") defined as one pixel for the target object, and a length in the line direction of the light detection window is the same as a length in the line direction of the pixel area.

The first electric charge transfer unit 12 outputs a clock signal that causes an electric charge accumulated by the first light-receiving unit 11 to be transferred to the first buffer register 13 at the timing that the first light-receiving unit 11 starts to receive light from the pixel area.

The second light-receiving unit 21 is disposed to be adjacent in the reverse of the scanning direction of the first light-receiving unit 11, and is a one-dimensional sensor having a plurality of light-receiving elements arranged in the same line direction as that of the first light-receiving unit 11. As in the first light-receiving unit 11, a length in the scanning direction of a light detection window is half of a length in the scanning direction of a pixel area, and a length in the line direction of the light detection window is the same as the length in the line direction of the pixel area.

The second electric charge transfer unit 22 outputs a clock signal that causes an electric charge accumulated by the second light-receiving unit 21 to be transferred to the second buffer register 23 at the timing that the second light-receiving unit 21 starts to receive light from the pixel area.

The output control unit 30 outputs a clock signal that causes an electric charge stored by the first buffer register 13 and the second buffer register 23 to be transferred to the output register 40 at the timing that the electric charge has been transferred to the second buffer register 23.

In the image capturing apparatus 100 of the above-described configuration, the first light-receiving unit 11 and the second light-receiving unit 12, which are disposed on a light-receiving surface and respectively have the light detection window, the lengths of which in the scanning direction are shorter than that of the pixel area of the target object, accumulate electric charges according to an amount of light received from the light detection windows, and the output control unit 30 outputs the electric charges accumulated by the first light-receiving unit 11 and by the second light-receiving unit 21 when optical scanning of the pixel area has been completed.

Thereby, a blur occurring in the scanning direction of an image captured by the one-dimensional sensor is reduced.

Next, an operation of the image capturing apparatus 100 will be described.

Figure 2:
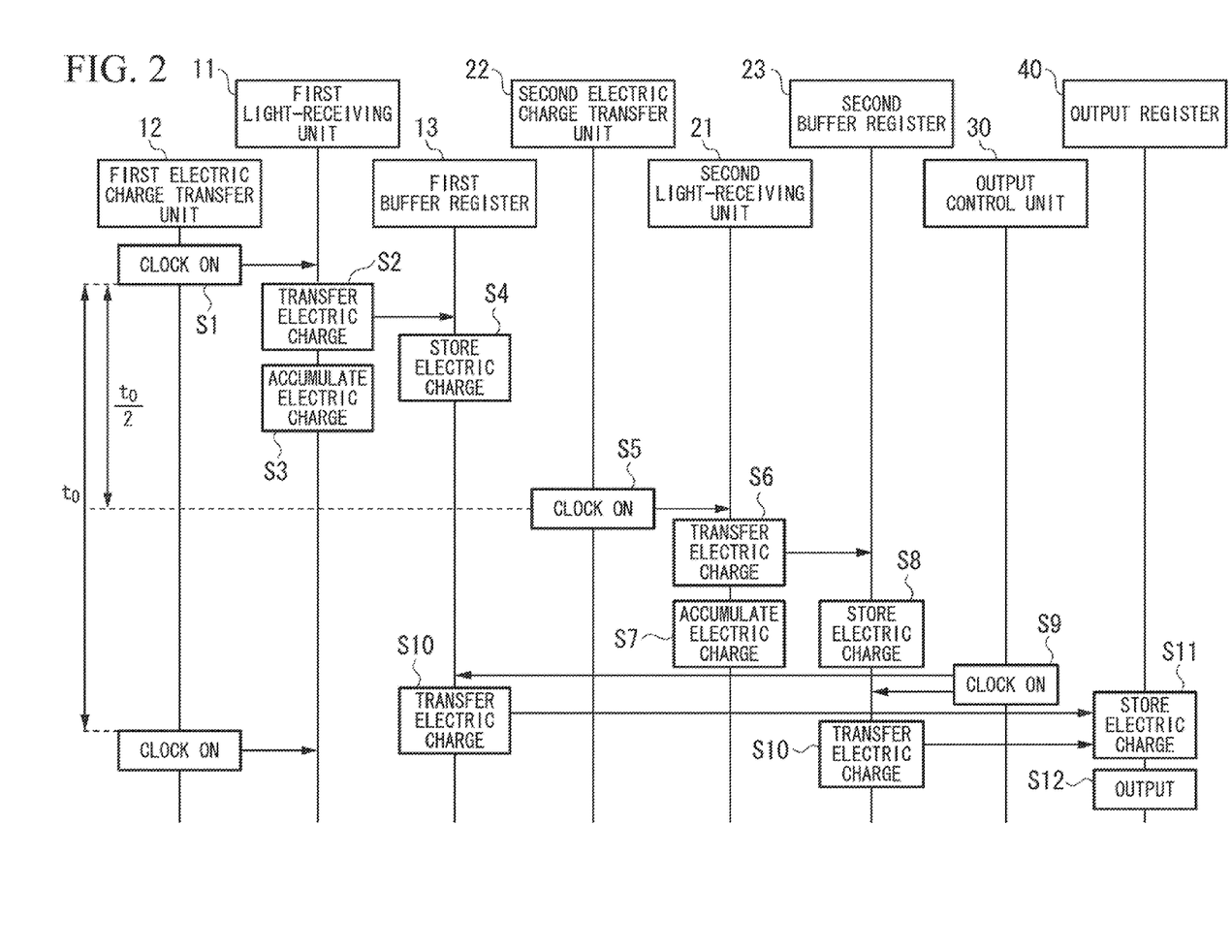
FIG. 2 is a sequence diagram showing an operation of the image capturing apparatus of the first embodiment.

FIG. 2 is a sequence diagram showing the operation of the image capturing apparatus.

First, when starting to capture an image of a target object, the image capturing apparatus 100 starts to move in the scanning direction.

When the image capturing apparatus 100 starts to move, the first charge transfer unit 12 outputs an electric charge transfer clock to the first light-receiving unit 11. Thereby, the first light-receiving unit 11 resets an accumulated electric charge by transferring the electric charge accumulated in each of the light-receiving elements to the first buffer register 13, and starts to accumulate an electric charge.

At this time, because the electric charge transferred to the first buffer register 13 is noise accumulated before image capturing is started (i.e., not an electric charge accumulated by photoelectric conversion of the target object), subsequent processing by the buffer register 13 is omitted.

When $t_0/2$ has elapsed since the first electric charge transfer unit 12 has output the electric charge transfer clock, the second electric charge transfer unit 22 outputs the electric charge transfer clock to the second light-receiving unit 21, and the second light-receiving unit 21 transfers the accumulated electric charge to the second buffer register 23. At this time, the electric charge transferred to the second buffer register 23 is also noise accumulated before image capturing is started.

The reason why the second electric charge transfer unit 22 outputs the electric charge transfer clock when $t_0/2$ has elapsed since the first electric charge transfer unit 12 has output the electric charge transfer clock will be described later.

Next, when a time $t_0$ in which the scanning of one pixel area is completed has elapsed since the first electric charge transfer unit 12 has output an initial electric charge transfer clock, the first electric charge transfer unit 12 outputs the electric charge transfer clock again (step S1).

The time $t_0$ in which the scanning of one pixel area is completed is obtained by multiplying the length in the scanning direction of the pixel area by a movement speed (a scanning speed) of the image capturing apparatus.

The electric charge transfer clock is output at an interval of the time $t_0$.

Thereby, the first light-receiving unit 11 can reset the accumulated electric charge every time when the scanning of the pixel area is completed. Thereby, the first buffer register 13 can accumulate an electric charge of the corresponding pixel area every time when the handling of the pixel area is completed.

If the first electric charge transfer unit 12 outputs the electric charge transfer clock in step S1, the first light-receiving unit 11 transfers the electric charge accumulated in each of the light-receiving elements to the first buffer register 13 (step S2). If the first light-receiving unit 11 transfers the electric charge, the first buffer register 13 stores the transferred electric charge (step S3). If the electric charge is transferred, the first light-receiving unit 11 starts to accumulate the electric charge again (step S4).

Next, if $t_0/2$ has elapsed since the first electric charge transfer unit 12 has output the electric charge transfer clock (see step S1), the second electric charge transfer unit 22 outputs the electric charge transfer clock to the second light-receiving unit 21 (step S5).

Regarding the timing that the second electric charge transfer unit 22 outputs the electric charge transfer clock, for example, the electric charge transfer clock output by the first electric charge transfer, unit 12 may be acquired, the time $t_0/2$ may be counted from the time, and the electric charge transfer clock may be output after the lapse of the time $t_0/2$.

Alternatively, the electric charge transfer clock may be output by a circuit that outputs the electric charge transfer clock by delaying the electric charge transfer clock by the time $t_0/2$ from the electric charge transfer clock output of the first electric charge transfer unit 12 in advance.

Hereinafter, the reason why the second electric charge transfer unit 22 outputs the electric charge transfer clock when $t_0/2$ has elapsed since the first electric charge transfer unit 12 has output the electric charge transfer clock will be described.

The length in the scanning direction of the light detection window of the image capturing element of the second light-receiving unit 21 is half the length in the scanning direction of the pixel area. The first light-receiving unit 11 and the second light-receiving unit 21 are disposed to be adjacent in the scanning direction. Thus, a position where the first light-receiving unit 11 exists when the first electric charge transfer unit 12 has output the electric charge transfer clock is identical to a position where the second light-receiving unit 21 exists when $t_0/2$ has elapsed since the first electric charge transfer unit 12 has output the electric charge transfer clock.

Thereby, the second light-receiving unit 21 starts to receive light when $t_0/2$ has elapsed since the first light-receiving unit 11 has started to receive light, so that the second light-receiving unit 21 can start to receive light in the same position as a position where the first light-receiving unit 11 has started to receive light.

That is, the second light-receiving unit 21 can start to receive light in the same position as a position where the first light-receiving unit 11 has started to receive light by means of the electric charge transfer clock output from the second electric charge transfer unit 22 when a period of time has elapsed since the first electric charge transfer unit 12 has output the electric charge transfer clock, where said period of time is obtained by multiplying a distance between an upper end in the scanning direction of the light detection window of the first light-receiving unit 11 and an upper end in the scanning direction of the light detection window of the second light-receiving unit 21 by the relevant movement speed.

If the second electric charge transfer unit 22 outputs the electric charge transfer clock in step S5, the second light-receiving unit 21 transfers the electric charge accumulated in each of the light-receiving elements to the second buffer register 23 (step S6).

If the electric charge is transferred, the second light-receiving unit 21 starts to accumulate the electric charge again (step S7).

The second buffer register 23 stores the transferred electric charge (step S8).

After the second buffer register 23 has completed an operation of storing the electric charge in step S8, that is, if a time Δt sufficient to complete the transfer of the electric charge has elapsed since the second electric charge transfer unit 22 has output the electric charge transfer clock, the output control unit 30 outputs the electric charge transfer clock to the first buffer register 13 and the second buffer register 23 (step S9).

If the output control unit 30 outputs the electric charge transfer clock, the first buffer register 13 and the second buffer register 23 transfer the stored electric charge to the output register 40 (step S10).

If the first buffer register 13 and the second buffer register 23 transfer the electric charge, the output register 40 stores the transferred electric charge (step S11).

Thereby, a sum of the electric charge stored in the first buffer register 13 and the electric charge stored in the second buffer register 23 is stored in the output register 40.

If the relevant electric charge is stored, the output register 40 outputs the stored electric charge to a signal processing circuit or the like (step S12).

Thereby, the output register 40 can reset the stored electric charge and wait for the next electric charge to be transferred.

Next, if $t_0$ has elapsed since the first electric charge transfer unit 12 has output the electric charge transfer clock in step S1, the first electric charge transfer unit 12 outputs the electric charge transfer clock to the first light-receiving unit 11.

Thereafter, the above-described processing is repeated until image capturing is completed.

Thereby, the image capturing apparatus 100 can capture an image of the target object.

Next, an explanation why a blur can be reduced in the scanning direction of the image according to this embodiment will be provided.

FIGS. 3A to 3F are diagrams illustrating amounts of received light of the first light-receiving unit and the second light-receiving unit.

Here, the case where the scanning of a pixel area B shown in FIGS. 3A to 3D is performed, that is, the case where a transition from FIG. 3A to FIG. 3D is made, will be described as an example.

Figure 3A:
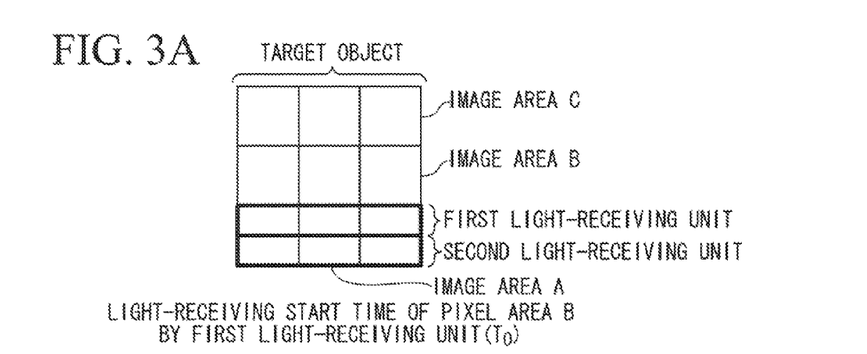
FIG. 3A is a diagram showing a scanning state for describing received light amounts of a first light-receiving unit and a second light-receiving unit.
Figure 3B:
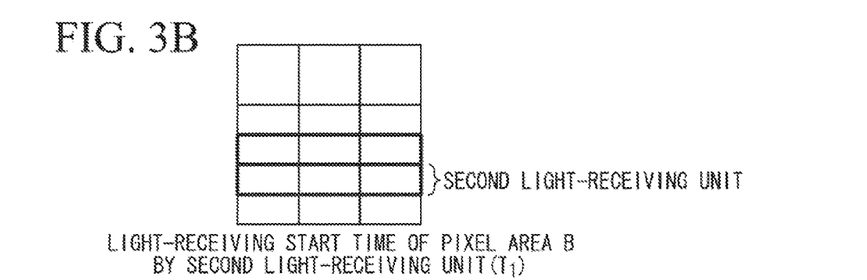
FIG. 3B is another diagram showing the scanning state.
Figure 3C:
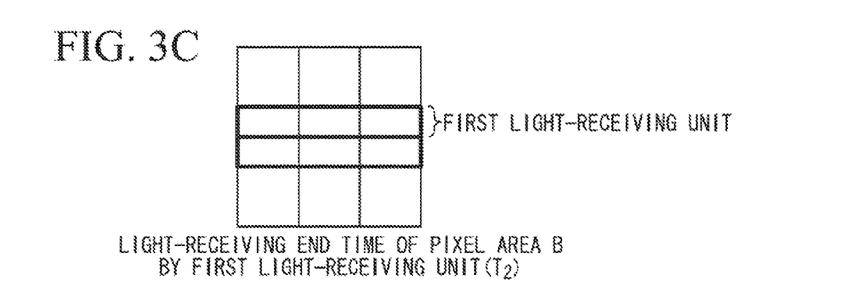
FIG. 3C is another diagram showing the scanning state.

The first light-receiving unit 11 starts to receive light from the pixel area B at a time $T_0$ as shown in FIG. 3A, and ends the reception of light from the pixel area B at a time $T_2$ as shown in FIG. 3C. That is, a period of time from the time $T_0$ to the time $T_2$ is a time $t_0$.

Figure 3D:
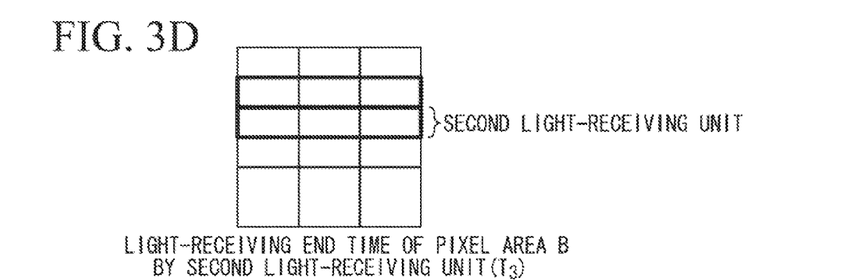
FIG. 3D is another diagram showing the scanning state.
Figure 3E:
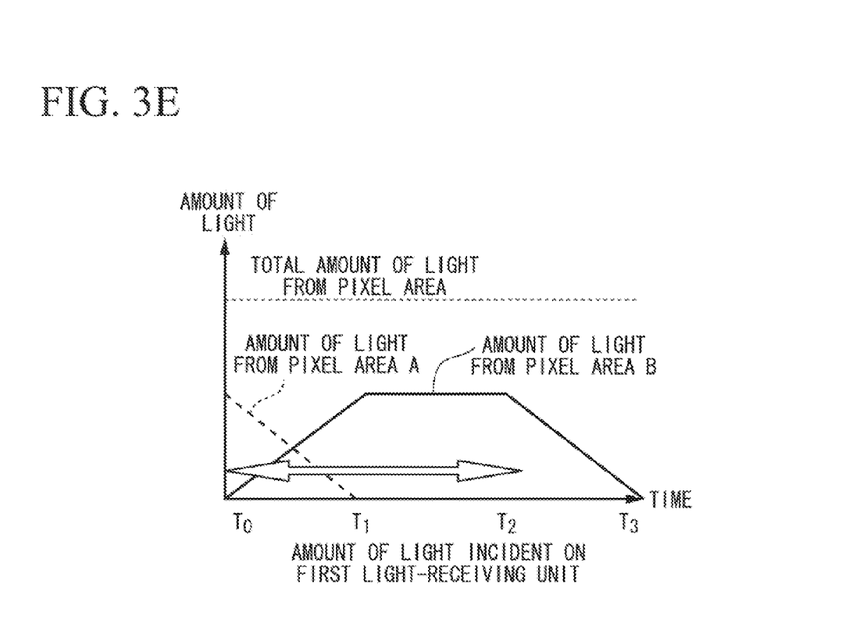
FIG. 3E is a diagram showing a received light amount of the first light-receiving unit.

As shown in FIG. 3E, regarding the amount of light received by the first light-receiving unit 11 at the time $T_0$, an amount of light received from the pixel area B is 0, and an amount of light received from a pixel area A is half of a total light amount of the pixel area A.

Next, the amount of light received from the pixel area B is increased, and the amount of light received from the pixel area A is decreased, in accordance with movement.

Because the first light-receiving unit 11 is separated from the pixel area A if the time $T_1$ is reached, the amount of light received from the pixel area B becomes half of a total light amount of the pixel area B, and the amount of light received from the pixel area A becomes 0.

Thereafter, because the first light-receiving unit 11 moves over the pixel area B until the time $T_2$ is reached, the amount of light received from the pixel area B is half of the total light amount of the pixel area B, and the amount of light received from the pixel area A is 0.

That is, between the time $T_0$ and the time $T_2$, the first light-receiving unit 11 can receive light from the pixel area B by an amount of light that is three times greater than the amount of light received from the pixel area A.

The second light-receiving unit 21 starts to receive light from the pixel area B at a time $T_1$ as shown in FIG. 3B, and ends the reception of light from the pixel area B at a time $T_3$ as shown in FIG. 3D.

Figure 3F:
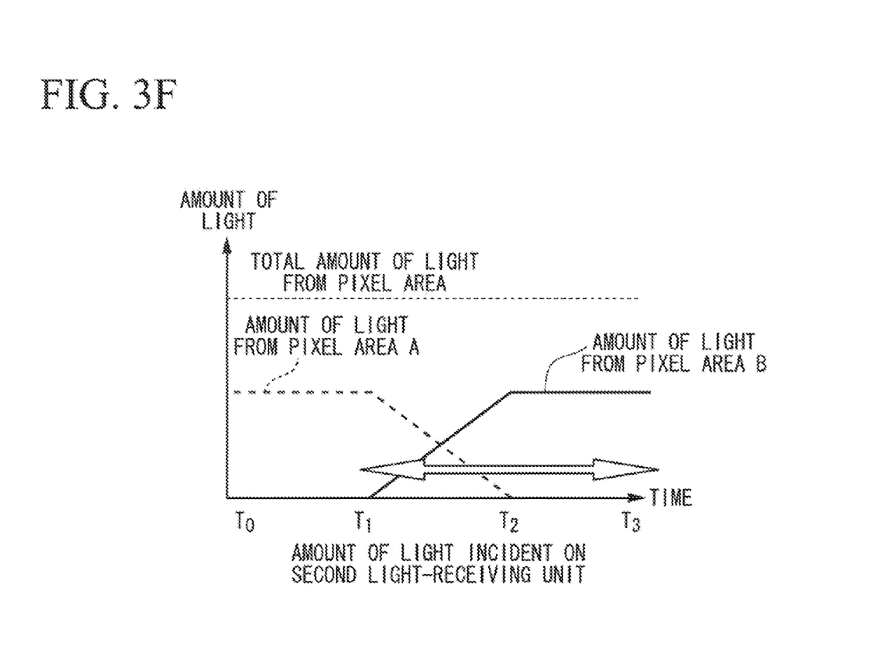
FIG. 3F is a diagram showing a received light amount of the second light-receiving unit.

As shown in FIG. 3F, regarding the amount of light received by the second light-receiving unit 21 at the time $T_1$, an amount of light received from the pixel area B is 0, and an amount of light received from the pixel area A is half of the total light amount of the pixel area A.

Next, the amount of light received from the pixel area B is increased, and the amount of light received from the pixel area A is decreased, in accordance with movement.

Because the second light-receiving unit 21 is separated from the pixel area A if the time $T_2$ is reached, the amount of light received from the pixel area B is half of the total light amount of the pixel area B, and the amount of light received from the pixel area A is 0.

Thereafter, because the second light-receiving unit 21 moves over the pixel area B until the time $T_3$ is reached, the amount of light received from the pixel area B is half of the total light amount of the pixel area B, and the amount of light received from the pixel area A is 0.

That is, between the time $T_1$ and the time $T_3$, the second light-receiving unit 21 can receive light from the pixel area B by an amount of light that is three times greater than the amount of light received from the pixel area A.

A received light amount of each of the first light-receiving unit 11 and the second light-receiving unit 21 is half of a received light amount accumulated in the technique of the related art, but it is possible to obtain the same received light amount as the received light amount accumulated in the technique of the related art by adding received light amounts accumulated in the first light-receiving unit 11 and the second light-receiving unit 21.

Therefore, according to this embodiment, it is possible to obtain the same received light amount as the received light amount accumulated by the technique of the related art, and further output an image in which a degree of a blur occurring in the scanning direction is smaller than it is in the technique of the related art.

Specifically, when the blur degree is reduced, there is an advantageous effect in that a value of a modulation transfer function (MTF), which is an evaluation index of spatial resolution, is great in this embodiment compared to the technique of the related art.

For example, assuming that the length in the scanning direction of the light detection window of the light-receiving element is $1/\alpha$ of the length in the scanning direction of the pixel area, MTF can be obtained by Equation (1).

$$\mathrm{MTF}=\sin(\pi/2\alpha)/(\pi/2\alpha) \qquad (1)$$

Accordingly, because the length in the scanning direction of the light detection window of the light-receiving element is ½ of the length in the scanning direction of the pixel area in the image capturing apparatus according to this embodiment, a result "$\alpha=2$" is obtained and MTF is improved about 1.41 times compared to the case of the technique of the related art ($\alpha=1$).

The first embodiment of the present invention has been described above in detail with reference to the drawings, but a specific configuration is not limited thereto and various design changes and the like may be made without departing from the scope of the present invention.

An example in which the length in the scanning direction of the light detection window of the light-receiving element is half the length in the scanning direction of the pixel area has been described in this embodiment, but the present invention is not limited thereto. It is possible to have the same advantageous effect by setting the length in the scanning direction of the light detection window of the light-receiving element to be shorter than the length in the scanning direction of the pixel area.

The smaller the length in the scanning direction of the light detection window of the light-receiving element, the lower the degree of blur and the smaller the amount of received light.

An example in which the first light-receiving unit 11 and the second light-receiving unit 21 are provided, that is, an example in which two light-receiving units are provided, has been described in this embodiment, but the present invention is not limited thereto. For example, 3 or more light-receiving units may be configured.

In this case, electric charge transfer units and buffer registers whose number corresponds to the number of light-receiving units are necessary. It is possible to output a higher signal level by increasing the number of light-receiving units.

As long as an amount of light can be sufficiently secured, a configuration having only one light-receiving unit is possible. In this case, an amount of received light is less than that of the technique of the related art, but it is possible to obtain an advantageous effect in that the degree of a blur is reduced.

Second Embodiment

Hereinafter, the second embodiment of the present invention will be described in detail with reference to the drawings.

Figure 4:
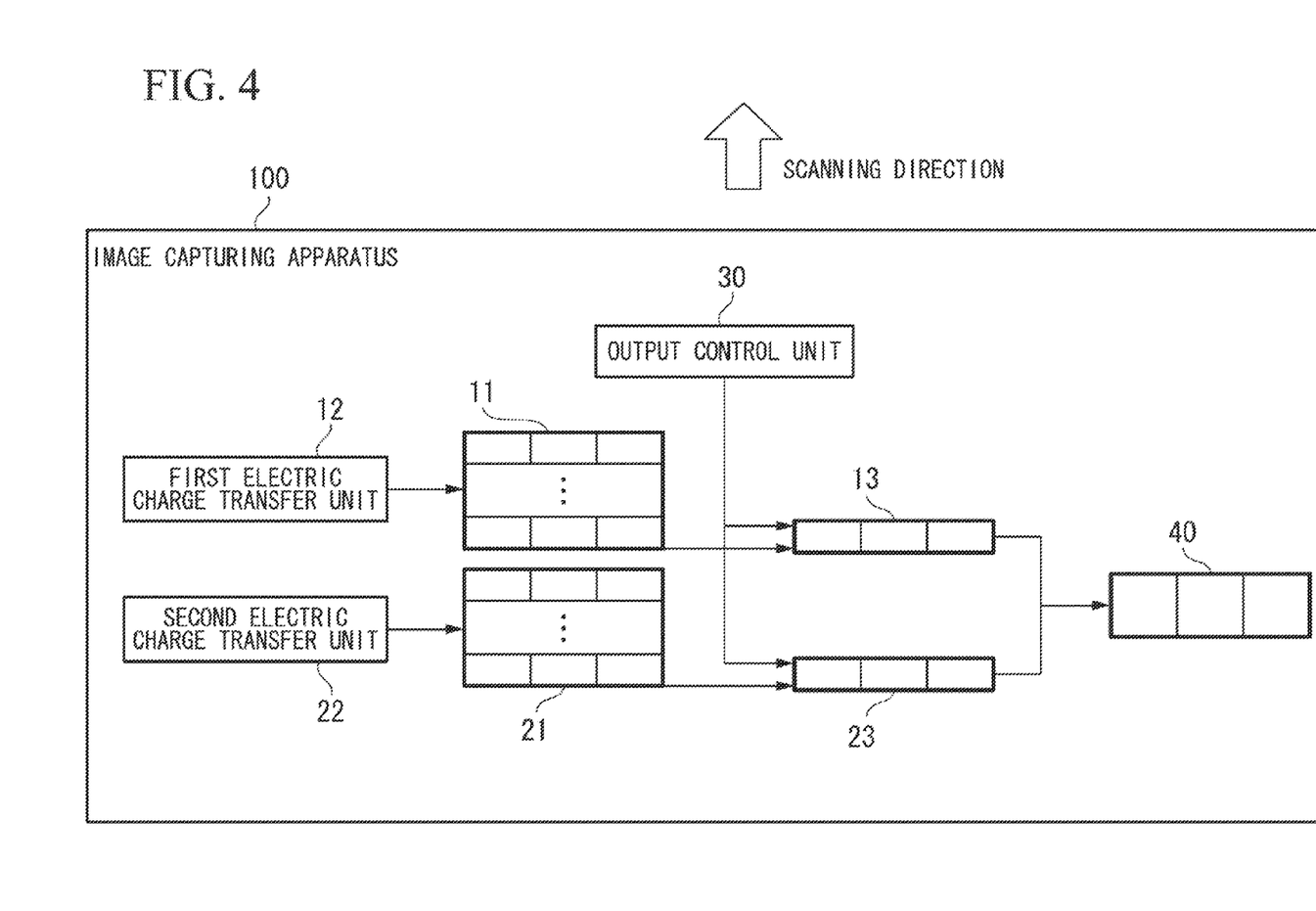
FIG. 4 is a schematic block diagram showing a configuration of an image capturing apparatus according to a second embodiment of the present invention.

FIG. 4 is a schematic block diagram showing a configuration of an image capturing apparatus according to the second embodiment of the present invention.

In an image capturing apparatus 100 according to the second embodiment, a first light-receiving unit 11 and a second light-receiving unit 21 are line CCDs having a time delay integration (TDI) function, and other configurations are the same as those of the first embodiment.

Here, the TDI function is a function of moving an electric charge in the reverse of the scanning direction of the CCD in synchronization with optical scanning of a target object, and integrating a normally obtained electric charge by a magnification proportional to the number of TDI stages, thereby obtaining a larger amount of electric charge.

Thus, the first light-receiving unit 11 and the second light-receiving unit 21 respectively have a plurality of light detection windows and a plurality of CCDs (charge coupled devices), each of which accumulates an electric charge corresponding to a received light amount of the light detection window, in the scanning direction, and also have a vertical transfer element for transferring an electric charge to a CCD adjacent in the reverse of the scanning direction among the CCDs.

In the image capturing apparatus according to the second embodiment, when the first light-receiving unit 11 accumulates the electric charge in step S3 described above, each relevant CCD of the first light-receiving unit 11 transfers the accumulated electric charge to a CCD adjacent in the reverse of the scanning direction when the time $t_0/2$ has elapsed from the start of electric charge accumulation. That is, the electric charge is transferred at the time when the image capturing apparatus has moved by a distance of half of the pixel area.

Thereby, each relevant CCD of the first light-receiving unit 11 transfers the electric charge to the CCD of the next stage twice while the image capturing apparatus moves through the pixel area.

Likewise, when the second light-receiving unit 21 accumulates the electric charge in step S7 described above, each relevant CCD of the second light-receiving unit 21 transfers the accumulated electric charge to the CCD adjacent in the reverse of the scanning direction when the time $t_0/2$ has elapsed from the start of electric charge accumulation.

In an example, the first receiving unit 11 has a first CCD and a second CCD in the scanning direction, and the first CCD scans the pixel area B in the scanning direction from an upper end in the scanning direction of the pixel area A. In terms of an electric charge accumulated by the first CCD when the time $t_0/2$ has elapsed, an electric charge generated by light received from the pixel area A is greater than an electric charge generated by light received from the pixel area B.

At this time, if the first CCD transfers the electric charge to the second CCD and light reception of the pixel area B is continuously performed, the electric charge generated by an amount of light received from the pixel area B is greater than the electric charge generated by an amount of light received from the pixel area A, in terms of the electric charge accumulated by the first CCD at the time when the scanning of the pixel area B has been completed.

Thereby, it is possible to reduce a mixture with an electric charge generated by a pixel area other than a target pixel area where light is received.

As described above, it is possible to reduce a blur degree of an obtained image by dividing the electric charge transfer in the scanning direction into multiple transfer steps.

Specifically, there is an advantageous effect in that an MTF value compared to the technique of the related art becomes equal to or greater than that obtained by the first embodiment.

For example, if the length in the scanning direction of the light detection window of the light-receiving element is $1/\alpha$ of the length in the scanning direction of the pixel area and the number of divisions of the electric charge transfer by the CCD is $\beta$, the MTF can be obtained by Equation (2).

$$\text{MTF} = \sin(\pi/2\alpha\beta)/(\pi/2\alpha\beta) \qquad (2)$$

Therefore, in the image capturing apparatus according to this embodiment, because the length in the scanning direction of the light detection window of the light-receiving element is ½ the length in the scanning direction of the pixel area and the CCD transfers the electric charge twice (through two steps), $\alpha=2$ and $\beta=2$. As compared to the case of the technique of the related art ($\alpha=1$ and $\beta=1$), the MTF is improved about 1.53 times.

The second embodiment of the present invention has been described above with reference to the drawings, but a specific configuration is not limited thereto and various design changes and the like may be made without departing from the scope of the present invention.

For example, the case where the CCDs of the first light-receiving unit 11 and the second light-receiving unit 21 transfer the accumulated electric charge to an adjacent CCD twice has been described in this embodiment, but the present invention is not limited thereto. The CCD may divide an electric charge transfer any number of times to transfer an electric charge.

Example 1

Figure 5:
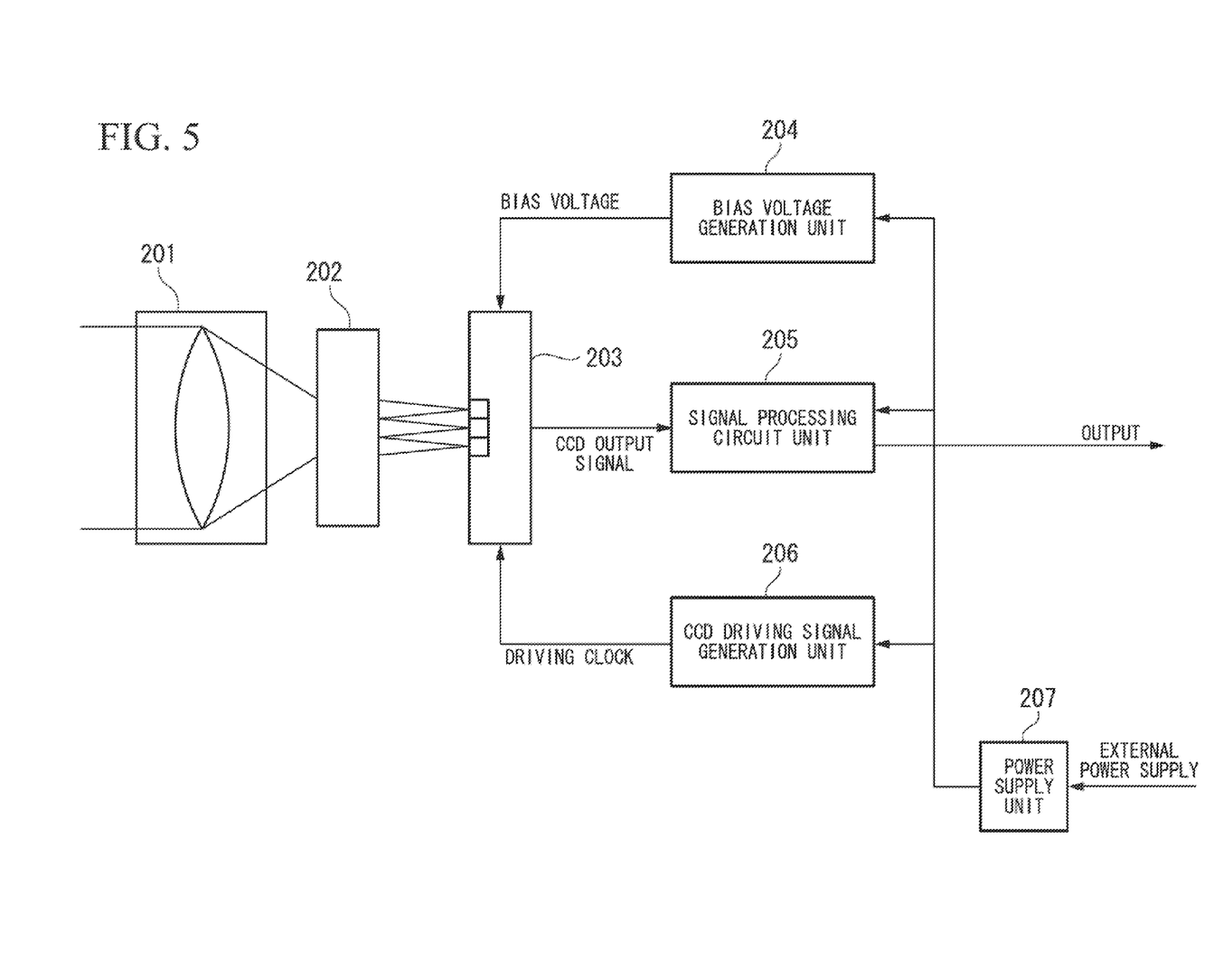
FIG. 5 is a configuration diagram of an image capturing apparatus showing an example for the present invention.

FIG. 5 is a configuration diagram of an image capturing apparatus showing an example for the present invention.

As shown in FIG. 5, an image capturing apparatus 200 includes an optical unit 201, a graded prism 202, a photoelectric conversion unit 203, a bias voltage generation unit 204, a signal processing circuit unit 205, a CCD driving signal generation unit 206, and a power supply unit 207.

The image capturing apparatus 200 is mounted on an artificial satellite (flying object), and the optical scanning of a ground surface (a target object) is performed by means of the movement of the artificial satellite. That is, the scanning direction is a moving direction of the artificial satellite.

The optical unit 201 forms an optical image of a target object on a light-receiving surface of the line CCD 203 via the graded prism 202. The optical unit 201 is constituted by a lens or the like.

The graded prism 202 disperses light passing through the optical unit 201 into lights belonging to a plurality of frequency bands.

The photoelectric conversion unit 203 includes a plurality of line CCDs respectively corresponding to the lights obtained by the dispersion of the graded prism 202, and each of the line CCDs photoelectrically converts the optical image formed on the light-receiving surface.

The photoelectric conversion unit 203 includes the first light-receiving unit 11, the first buffer register 13, the second light-receiving unit 21, the second buffer register 23, and the output register 40 according to the first and second embodiments described above.

The bias voltage generation unit 204 generates a bias voltage necessary for the line CCD of the photoelectric conversion unit 203.

The signal processing circuit unit 205 performs signal processing such as amplification of an image capturing signal output by the photoelectric conversion unit 203, and outputs the processed image capturing signal to an external device as an image sensor output (signal).

The CCD driving signal generation unit 206 generates a clock signal necessary to drive the line CCD. The CCD driving signal generation unit 206 includes the first electric charge transfer unit 12, the second electric charge transfer unit 22, and the output control unit 30 according to the first and second embodiments described above.

The power supply unit 207 converts an input from an external power supply into a voltage, and supplies the voltage to each processing unit.

Next, an operation of the image capturing apparatus 200 will be described.

First, an optical image of a target object is incident on the graded prism 202 by the optical unit 201.

Next, the graded prism 202 disperses the optical image of the target object into lights of different wavelengths, which are respectively incident on the photoelectric conversion unit 203.

A varying amount of light of the image formed by the photoelectric conversion unit 203 is photoelectrically converted into an electric signal, which is sent to the signal processing circuit unit 205.

The signal processing circuit unit 205 performs signal processing such as amplification of a photoelectrically converted image capturing signal, or the like, and outputs the processed image capturing signal to an external device as an image sensor output.

An electric charge transfer clock output by the CCD driving signal generation unit 206 is, for example, a 3-phase clock. Thereby, the line CCD of the photoelectric conversion unit 203 causes a potential level to be sequentially varied, and transfers the accumulated electric charge to an output side.

The example for the present invention has been described above, but a specific configuration is not limited thereto and various design changes and the like may be made without departing from the scope of the present invention.

For example, the case where the graded prism 202 disperses an optical image of a target object into lights of different wavelengths, which are respectively incident on different line CCDs, has been described in this example, but the present invention is not limited thereto. For example, the photoelectric conversion unit 203 may photoelectrically convert an optical image belonging to a single band in which light is collected without using the graded prism 202.

An example in which the image capturing apparatus 200 is mounted on an artificial satellite has been described in this example, but the present invention is not limited thereto. For example, it may be mounted on another flying object such as an airplane, or mounted on a measurement device such as a scanner.

INDUSTRIAL APPLICABILITY

According to the present invention, because a length in a scanning direction of a detection window provided in a light-receiving device is shorter than a length in the scanning direction of a pixel area, an amount of light received from the scanned pixel area is greater than an amount of light received from another pixel area, and a blur in the scanning direction of an acquired image can be reduced.

REFERENCE SYMBOLS

11: first light-receiving unit
12: first electric charge transfer unit
13: first buffer register
21: second light-receiving unit
22: second electric charge transfer unit
23: second buffer register
30: output control unit
40: output register

The invention claimed is:
1. An image capturing apparatus comprising:
a light-receiving device configured to perform an optical scan of a target object by accumulating an electric charge from an entire area of the target object during the optical scan only when the light-receiving device is disposed over a light detection window, a length of which in the scanning direction is shorter than a length in the scanning direction of an area defined as one pixel of the target object; and
an output device configured to output a signal corresponding to the amount of electric charge accumulated by the light-receiving device when the light-receiving device has completed the optical scan of the area defined as one pixel, wherein
the entire area of the target object is optically scanned by repeating the electric charge accumulation by the light-receiving device and the electric charge output by the output device.
2. The image capturing apparatus according to claim 1, wherein:
a plurality of the light-receiving devices are arranged in the scanning direction on the light-receiving surface;
for a present light-receiving device among the plurality of the light-receiving devices which is disposed adjacent to a prior light-receiving device in the scanning direction, accumulation of an electric charge of the present light-receiving device starts when a period of time has elapsed since the prior light-receiving device has started to accumulate an electric charge, where said period of time is obtained by multiplying a distance between an upper end of the light detection window of the prior light- receiving device and an upper end of the light detection window of the present light-receiving device by a speed of the scanning; and the output device adds and outputs the electric charges accumulated by the plurality of the light-receiving devices.

3. The image capturing apparatus according to claim 1, wherein the light-receiving device comprises:

a plurality of the light detection windows arranged in the scanning direction;

a plurality of electric charge accumulation elements respectively disposed to correspond to the light detection windows, where the electric charge accumulation elements each accumulate an electric charge according to an amount of light received from the corresponding light detection window; and a vertical transfer element that:

transfers the accumulated electric charge to the electric charge accumulation element adjacent in the reverse of the scanning direction among the plurality of electric charge accumulation elements while image capturing is being performed on an area defined as one pixel of the target object in the scanning direction, where the transfer is performed a plurality of times at regular intervals; and adds the electric charges sequentially accumulated by the plurality of electric charge accumulation elements.

4. The image capturing apparatus according to claim 1, wherein the image capturing apparatus is mounted on a flying object and the scanning direction is a traveling direction of the flying object.

5. An image capturing method comprising:

performing, by a light-receiving device, an optical scan of a target object by accumulating an electric charge from an entire area of the target object during the optical scan only when the light-receiving device is disposed over a light detection window, a length of which in the scanning direction is shorter than a length in the scanning direction of an area defined as one pixel of the target object; and outputting a signal corresponding to the amount of electric charge accumulated by the light-receiving device when the light-receiving device has completed the optical scan of the area defined as one pixel, wherein the entire area of the target object is optically scanned by repeating the electric charge accumulation by the light-receiving device and the electric charge output.

6. An image capturing circuit comprising:

a light-receiving circuit configured to perform an optical scan of a target object by accumulating an electric charge from an entire area of the target object during the optical scan only when the light-receiving circuit is disposed over a light detection window, a length of which in the scanning direction is shorter than a length in the scanning direction of an area defined as one pixel of the target object; and an output circuit configured to output a signal corresponding to the amount of electric charge accumulated by the light-receiving device when the light-receiving circuit has completed the optical scan of the area defined as one pixel, wherein the entire area of the target object is optically scanned by repeating the electric charge accumulation by the light-receiving circuit and the electric charge output by the output circuit.

7. The image capturing apparatus according to claim 1, wherein:

a plurality of the light-receiving devices are arranged in the scanning direction on the light-receiving surface;

for a present light-receiving device among the plurality of the light-receiving devices which is disposed adjacent to a prior light-receiving device in the scanning direction, accumulation of an electric charge of the present light-receiving device starts when a period of time has elapsed since the prior light-receiving device has started to accumulate an electric charge, where said period of time is a time required for the present light-receiving device to reach a position where the prior light-receiving device started to accumulate the electric charge; and the output device adds and outputs the electric charges accumulated by the plurality of the light-receiving devices.

8. The image capturing apparatus according to claim 1, wherein the light receiving device comprises a first light receiving unit and a second light receiving unit.

\* \* \* \* \*